(12) United States Patent
Forsee, II et al.

(10) Patent No.: US 8,594,281 B2
(45) Date of Patent: Nov. 26, 2013

(54) DYNAMIC MENU FRAMEWORK

(75) Inventors: Daniel E. Forsee, II, Dover, DE (US);
Ethan U. Fletcher, Wilmington, DE
(US); Kyle A. Tobin, Middletown, DE
(US)

(73) Assignee: Bank of America Corporation,
Charlotte, NC (US)

( * ) Notice: Subject to any disclaimer, the term of this
patent is extended or adjusted under 35
U.S.C. 154(b) by 2 days.

(21) Appl. No.: 13/346,873

(22) Filed: Jan. 10, 2012

(65) Prior Publication Data

US 2013/0177139 A1 Jul. 11, 2013

(51) Int. Cl.
*H04M 1/64* (2006.01)
(52) U.S. Cl.
USPC .............. 379/88.01; 379/88.18; 704/275; 704/246
(58) Field of Classification Search
USPC .............. 704/275, 246; 379/88.01, 88.18
See application file for complete search history.

(56) References Cited

U.S. PATENT DOCUMENTS

| | | | |
|---|---|---|---|
| 2003/0191648 A1* | 10/2003 | Knott et al. | 704/275 |
| 2006/0080107 A1* | 4/2006 | Hill et al. | 704/275 |
| 2006/0116877 A1* | 6/2006 | Pickering et al. | 704/231 |

\* cited by examiner

*Primary Examiner* — Gerald Gauthier
*Assistant Examiner* — Simon King
(74) *Attorney, Agent, or Firm* — Banner & Witcoff, Ltd.;
Michael A. Springs (57) ABSTRACT

Systems, methods, and computer readable media for providing a customer service system are provided. In some examples, the customer service system may include a telephone interface and may recognize both speech responses (e.g., voice commands) and/or touch tone responses. The system may include one or more rules for identifying options based on received user input. In some examples, the options provided based on touch tone input may be different from those based on received speech input. In some examples, the speech responses may be determined to meet a confidence threshold in order to progress to the next menu level or set of options. The confidence threshold may be adjusted and/or may be different or customizable for different menu options, levels, and the like.

19 Claims, 5 Drawing Sheets

DYNAMIC MENU FRAMEWORK

BACKGROUND

Customer service is an important part of many industries. Providing quick, efficient customer service can be important to maintaining customer relationships and securing new customers. Conventional customer service systems can be cumbersome and may provide options unnecessary to service a particular client. In addition, making updates to an automated customer service system may be cumbersome and may require retesting of the entire system prior to implementation. Accordingly, a system and method of providing a customer service system that can be easily modified and is adaptable to user needs, as well as providing efficient service to the customer, would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, systems, methods, apparatuses, and computer readable media for a customer servicing are provided. In some examples, a configurable set of rules for a customer service system having a processor and a customer service interface may be determined. In some arrangements, the customer service system may provide a first option set to a customer via the customer service interface. The customer service interface may be a telephone interface. In other aspects, user input selecting a first option from the first option set via the customer service interface may be received. The user input received may be speech (e.g., voice command) or touch tone. In at least some examples, a second option sent to the customer via the customer service interface based on the received first option selection. In some arrangements, the second option set may be based, at least in part, on the first option selected and the type of user input.

In still other aspects, the customer service system may determine a confidence level associated with the accuracy of the first option selection received via speech input. The system may determine whether the confidence level is at or above a predetermined threshold. In some examples, the second option set may be provided based on the confidence level being at or above the predetermined threshold, or the user may be prompted for additional input if the confidence level is below the predetermined threshold.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
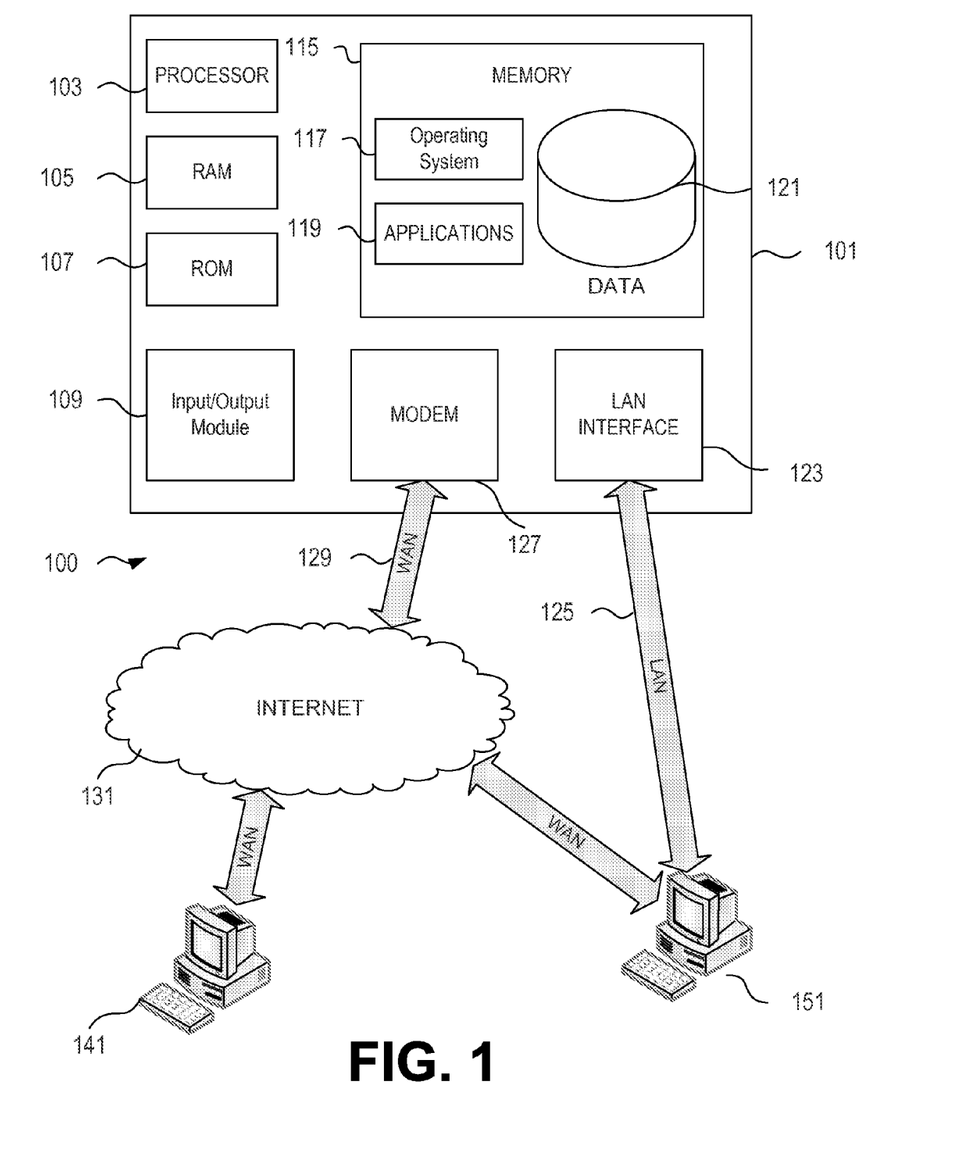
FIG. 1 illustrates an example operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computing device 101 may have a processor 103 for controlling overall operation of the device and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The computing device 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the server 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The above-described systems may be used in various businesses or corporate entities, such as financial institutions or other entities, to provide efficient, user-friendly customer services interfaces. For instance, a financial institution, such as a bank, may implement the systems, methods, and the like described herein, to provide a customer service interface to one or more customers, such as via a telephone system. The system may recognize both speech and touch tone input and may be adaptable such that the rules associated with one or more menus, options, and the like within the system may be updated, modified, and the like without extensive modifications to the overall system, testing of the modified system, and the like. Further, the system may be customizable such that one or more options or sets of options may be based on information associated with the customer making the selections. In still other examples, the system may be extendible such that, as new options become available, desirable, and the like, those options may be added to the system with relative ease.

Although several examples used herein may include reference to a financial institution or bank, the systems, methods, apparatuses, and computer readable media described herein may be used in a variety of industries (e.g., service and non-service industries), corporations, businesses, government agencies, universities, and the like. Nothing in the specification or figures should be viewed as limiting the invention to only use with banking or banking related companies or entities.

Figure 2:
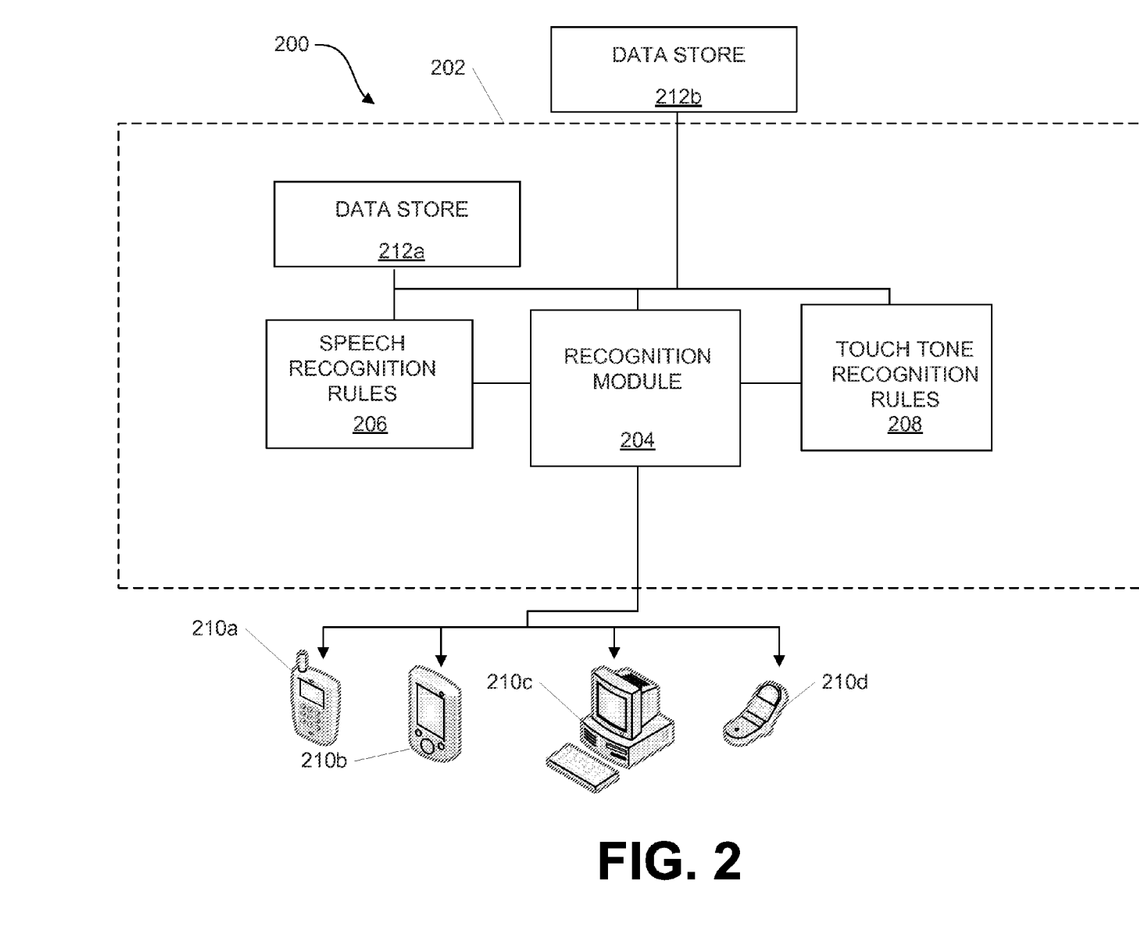
FIG. 2 illustrates an example system for providing customer service according to one or more aspects described herein.

FIG. 2 illustrates one example customer service system according to at least some aspects described herein. One or more modules or units shown in FIG. 2 may be separate devices or may, in some examples, be within the same physical device. Additionally or alternatively, although various aspects of FIG. 2 are illustrated as modules, it should be understood that each module (or combination of modules) may include one or more processors, memories, hardware, software, and the like, as discussed above with respect to FIG. 1, to provide one or more computing devices with various functionalities.

The customer service system 200 may be part of or associated with an entity 202, such as the entity implementing the system. The entity 202 may be a business, corporation, university or other educational institution, government agency, and the like. In some examples, the entity 202 may be a financial institution, such as a bank. For simplicity, the customer service system 200 will be described in terms of a financial institution and forecasting loss or risk associated with products and or services of a financial institution. However, nothing in the specification or figures should be viewed as limiting the loss forecasting system to only banks or banking related entities.

The customer service system 200 may include a recognition module 204. The recognition module 204 may receive user input from one or more user devices, such as devices 210a-210d. For instance, a user may connect to the customer service system 200 from one or more of a smart phone 210a, personal digital assistance (PDA) 210b, computer (such as a laptop, desktop, notebook, tablet, and the like) 210c, and/or cell phone 210d, or other device, such as a landline based telephone. For simplicity, the customer service system 200 may be discussed herein as being accessed via a telephone or voice over IP (VoIP) connection, such as a cell phone, smart phone, landline based telephone, and the like. Nothing in the description should be viewed as limiting the system to only being accessed via telephone.

A customer or user may access the system 200, such as via one or more user devices 210a-210das discussed above, and may interact with a recognition module 204. The recognition module 204 may receive user input, such as a call, request for customer service, and the like, and may prompt a user to make a selection. In some examples, the recognition module 204 may provide the user with a set of options and a selection may be made via speech or touch tone selection. For instance, the recognition module may provide options for type of help needed. In some examples, the options may include "for checking account information press 1 or say "checking account." In other examples, the recognition system may prompt a customer by asking "how can we help you today?" The customer may then respond with a spoken response. For example, the customer may say "checking account." Or the customer may select a numeric button to provide a touch tone response (e.g., select 0 which may connect the customer with a representative). The recognition module 204 may recognize both speech and touch tone responses or input provided by the user. The software used to recognize speech and/or touch tone may be known systems, software, and the like.

Once a selection is made, the recognition module may access one or more rules appropriate to the selection made. For instance, if the input/selection received is a spoken response, the recognition module may access one or more rules in the speech recognition rules module 206. The speech recognition rules module may apply one or more predetermined rules to identify one or more additional options to provide to the user, for instance, in response to the first selection received by the recognition module. If the input/selection received is a touch tone selection, the recognition module 204 may access one or more rules in a touch tone recognition module 208. The touch tone recognition rules module 208 may apply one or more predetermined rules to identify one or more additional selection options to provide to the user based on the first selection received. In some examples, the system may be configurable such that the rules stored may be revised, updated, new rules added, and the like while the system is in use (e.g., while the system is operating, while a customer is accessing the system, and the like). In still other examples, one or more call options may be individually replaceable, modifiable, and the like, as desired, without modifying all rules or the entire system.

The recognition module 204, speech recognition rules module 206 and touch tone recognition rules module 208 may access one or more data stores 212a and 212b. In some examples, the data store may be within or associated with the entity 202, such as data store 212a. Additionally or alternatively, the data store may be external to the entity 202, e.g., a third party data warehouse, and the like, such as data store

212*b*. The data stores 212*a* and 212*b* may store information associated with one or more customers associated with the entity. That is, when a customer accesses the customer service system 200, the modules 204, 206, 208, may access information associated with the customer in order to better serve the customer.

In some examples, the customer information stored in the data stores 212*a*, 212*b*, may be used to identify one or more options to provide to the user for selection. In still other examples, the customer information in data stores 212*a*, 212*b* may be used to prioritize one or more identified options being provided to the customer, e.g., based on customer preferences, types of accounts associated with that customer, and the like. In still other examples, one or more customer selections received by the customer service system 200 may be stored in data stores 212*a*, 212*b* in order to update customer information and provide historical information that may be used if the customer interacts with the customer service system 200 at a later time. These arrangements will be described more fully below.

Figure 3:
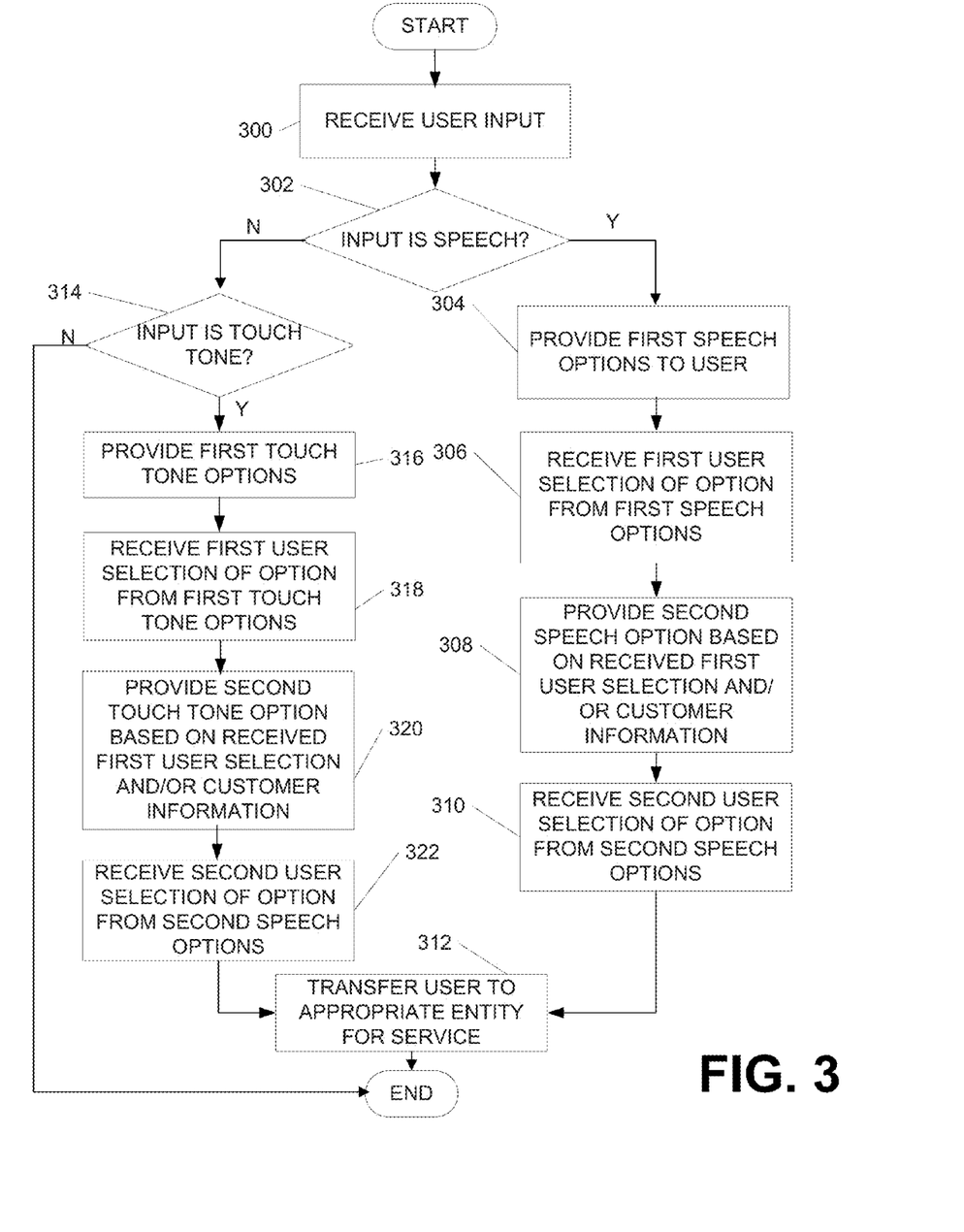
FIG. 3 illustrates an example method of accessing and using a customer service system according to one or more aspects described herein.

FIG. 3 illustrates one example method of accessing and using the customer service system, such as system 200 in FIG. 2. In step 300, user input may be received. For instance, user input may be a call to the customer service system, selection of a customer service option from a menu (e.g., touch tone, speech), and the like. Once the system has been accessed, additional user input may be received in step 300. In step 302, a determination is made as to whether the received input is spoken input. If the input is speech, the recognition module (such as module 204 in FIG. 2) may access one or more rules in a rules recognition module (such as module 206 in FIG. 2) and may provide first speech options to the user in step 304. The first speech options may be general menu options or "top level" menu options. In step 306, first user selection of an option from the first speech options may be received. Based on the received first user selection, second speech options may be provided to the user in step 308. The second speech options may be determined based on the first user selection received. In some examples, the second speech options may be based, at least in part, on one or more attributes of the customer, as will be described more fully below. In step 310, a second user selection may be received from the second speech options provided. Based on the selection made in step 310, the user may be transferred to an appropriate entity for service in step 312.

If, in step 302, it is determined that the received user input is not speech, a determination is made in step 314 as to whether the received user input is touch tone. If not the process may end. If the received user input is touch tone, first touch tone options may be provided to the user for selection in step 316. In some examples, the first touch tone options may be the same or substantially the same as the first speech options provided in step 304. Alternatively, the first touch tone options provided in step 316 may be different from the first speech options provided in step 304. The difference may be based, at least in part, on differences between the rules used to determine the touch tone options and the rules used to determine the speech options.

In step 318, user selection of one of the first touch tone options is received. In step 320, second touch tone options may be provided to the user for selection. The second touch tone options may be based on the received first touch tone selection in step 318. In some examples, the if the received first touch tone input is the same as or substantially similar to the received first speech input, the second touch tone options provided may, in some examples, be different from the second speech options provided in step 308. This may be due to differences between the rules for determining the second speech options and the rules for determining the second touch tone options. In other examples, the second touch tone options may be the same as or substantially similar to the second speech options.

In step 322, second user input is received selecting one of the second touch tone options provided and, in step 312, the user may be transferred to an appropriate entity for service based on the second input received in step 322.

Figure 4:
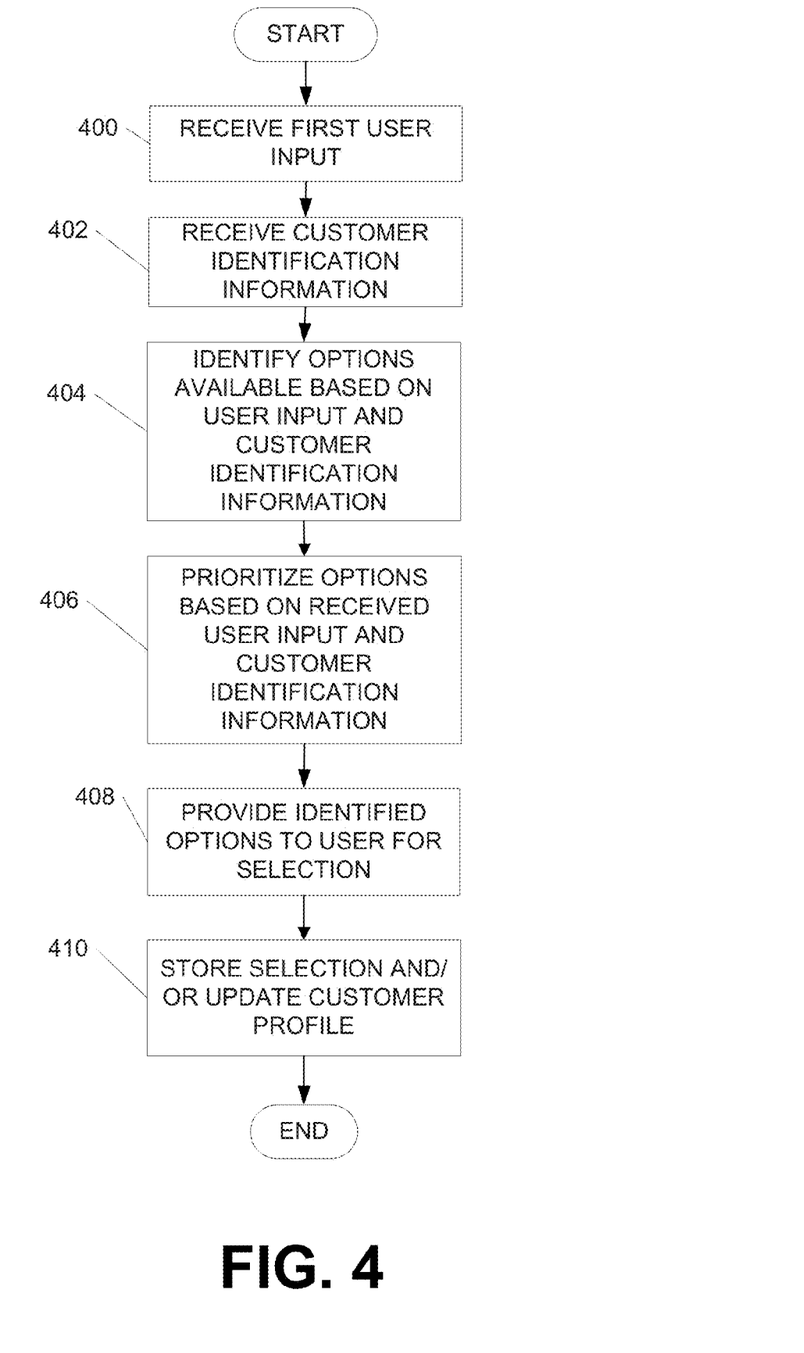
FIG. 4 illustrates one example method of identifying options and presenting them to a customer for selection according to one or more aspects described herein.

FIG. 4 illustrates one example method of identifying options and prioritizing them for presentation to a customer according to at least some examples described herein. In step 400, first user input may be received. The first user input may be speech or touch tone. However, as discussed above, speech options may be determined separately from and/or may be different from touch tone options, as will be described more fully below.

In step 402, customer identification information may be received. The customer identification information may include the user/customer's name, date of birth, account number, Social Security Number (or portion thereof), password, pin number, and the like. The customer identification information may then be used to identify one or more options the customer is eligible for and/or may be useful to servicing the customer in step 404. The options may be identified based on rules found in the speech rules module 206 or touch tone rules module 208 in FIG. 2, depending on the type of user input received. As discussed above, the options identified for presentation to the user/customer may be different depending on the type of user input received (e.g., speech or touch tone).

In step 406, the identified options may be prioritized based on the received user input and/or customer identification information. For instance, a customer may be grouped in a specific customer type and customers of that type may be eligible to receive one or more promotions, additional options for service, and the like. Additionally or alternatively, the options provided to the customer may be customized or tailored to the customer as an individual. For instance, if the customer has a checking account at the bank and a mortgage, the customer may receive options for selection dealing with those two types of accounts. Additional options may be provided to add another service (e.g., open a savings account, take out a mortgage, and the like). However, the main options provided or, in some cases, the majority of the options provided, may be directed to options dealing with the services the customer uses at the bank.

These options may then be prioritized based on predetermined desirability to the customer, or other factors. For example, the user may have a history of calling the customer service system to check a balance in his or her checking account. Accordingly, the system may provide that option as the first option for selection.

In step 408, the identified and/or prioritized options may be provided to the user for selection. In step 410, the user selection may be received and may be stored. In some examples, the user selection may be used to update a customer profile for the customer. For instance, it may be used to build historical information that may be used to better serve the customer in the future. For instance, as discussed above, previous selections by the user may be stored in a customer profile in order to identify particular options that have been selected by the customer in the past and or to prioritize options that are frequently selected by the user.

Figure 5:
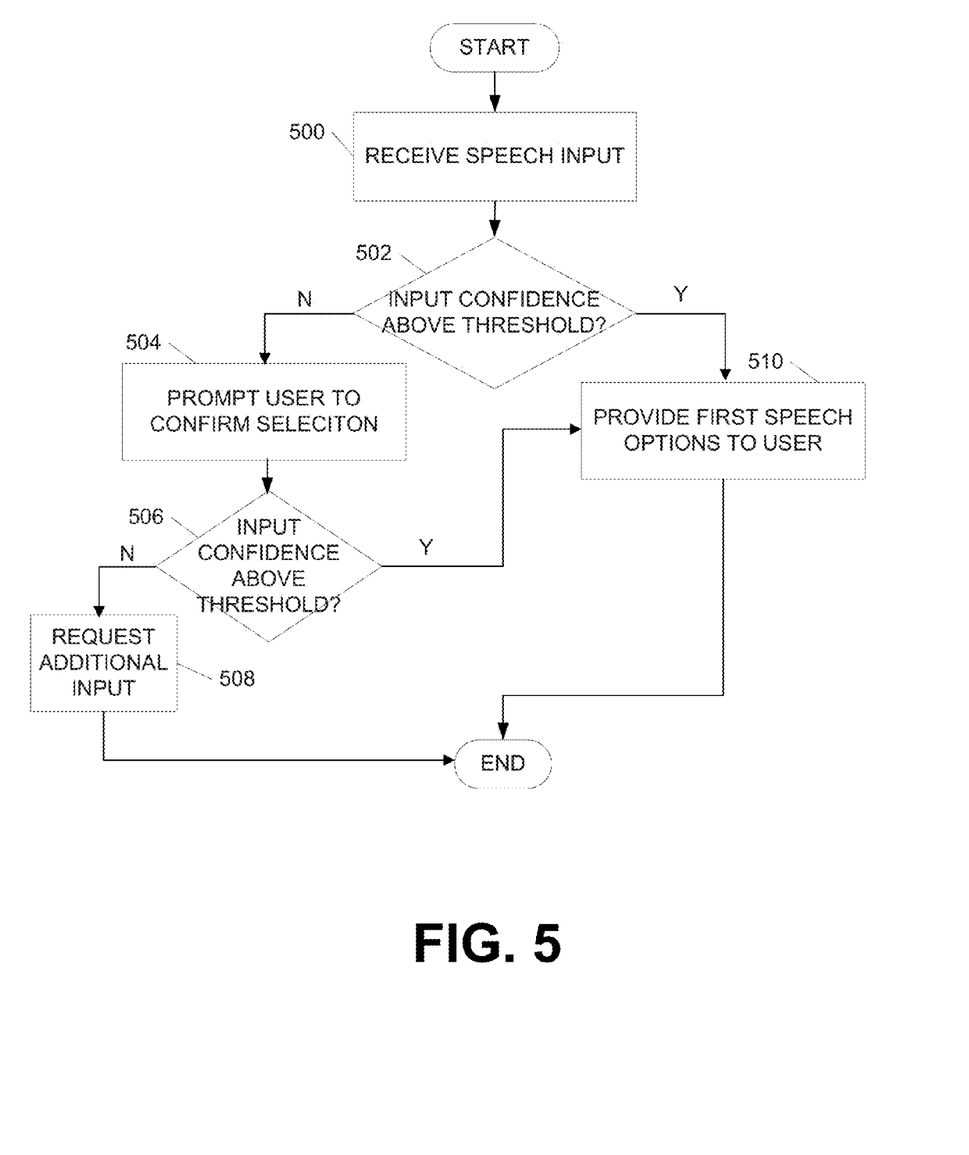
FIG. 5 illustrates one example method of determining a confidence level in a speech response according to one or more aspects described herein.

FIG. 5 illustrates one example method of determining a confidence level in a speech response according to one or more aspects described herein. In step 500, speech input is received from a user. The speech input may be any input, for instance, at any menu level. In step 502, a determination is made as to whether the confidence in the accuracy of the speech input is above a predetermined threshold. For instance, a user may speak a word that is unclear. Additionally or alternatively, the user may use a word that is vague such as "card" which may refer to a debit or credit card. Accordingly, if the confidence is below a predetermined threshold in step 502, the user may be prompted to confirm the selection or input in step 504. For instance, the customer service system may repeat the selection to the user and ask the user to say (e.g., yes or no) whether that is the selection desired. Alternatively, the customer service system may prompt the user to repeat the selection made.

In step 506, a determination is made as to whether the confirmation input received is above a predetermined threshold. This predetermined threshold may be the same as or different from the threshold in step 502. If confidence in the confirmation input is below the threshold, additional input may be requested in step 508. For instance, the customer service system may prompt the user to select an option using a touch tone response rather than speech. Additionally or alternatively, the system may automatically transfer the user to a customer service representative.

Alternatively, if the confidence level is at or above the predetermined threshold in either step 502 or step 506, first speech options may be provided to the user in step 510. In some examples, the speech options provided may be based, at least in part, on the speech input received in step 500.

In some arrangements, the predetermined threshold for measuring confidence may be different and/or adjustable based on the option, menu level, and the like. For example, a top level menu may have a confidence threshold of 90% in order to advance to the next menu options. That is, if the confidence level in the received speech input is 90% or greater, the system will advance to the next menu level and will provide options to the user. Alternatively, if the confidence in a response is between 60% and 90%, the user may be prompted to confirm the selection, as discussed above. In another example, the term "help" may be uttered at any menu level in order to obtain assistance. The threshold for this word may be lower in order to more easily provide help to the user. For instance, if the confidence in received speech input constituting a request for help is 50% or greater, the system may automatically advance the user to a help menu, representative, and the like. This may reduce to chance of having to confirm the selection, provide additional selections, and the like in order to obtain the desired assistance.

Additionally or alternatively, the confidence levels and utterances or speech responses received may be stored (for instance, in data store 212a and 212b in FIG. 2). These confidence levels and responses may be used to "tune" the customer service system and/or speech recognition system in order to better understand a customer's response, adjust confidence thresholds, and the like. That is, confidence thresholds may be adjusted based on historical performance of the system to be more or less stringent in order to provide more efficient customer service.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. An apparatus, comprising:
at least one processor; and
memory operatively coupled to the at least one processor and storing computer readable instructions that, when executed, cause the apparatus to:
determine a configurable set of rules for a customer service system having a processor and a customer service interface;
provide a first option set to a customer via the customer service interface;
receive user input selecting a first option from the first option set via the customer service interface, wherein a type of the user input is one of a voice command and a keypad selection; and
responsive to selection of the first option, provide a second option set to the customer via the customer service interface the second option set being based on the first option selected and the type of the user input,
wherein the type of the user input selecting the first option is voice command, and
wherein the memory stores additional computer readable instructions that, when executed, further cause the apparatus to:
determine a confidence level of an accuracy of the received selection of the first option;
determine whether the confidence level is at or above a predetermined threshold;
responsive to determining that the confidence level is at or above the predetermined threshold, provide the second option set to the customer; and
responsive to determining that the confidence level is below the predetermined threshold, request additional user input from the customer.

2. The apparatus of claim 1, wherein the second option set is based, at least in part, on a customer characteristic of the customer.

3. The apparatus of claim 1, wherein the customer service interface is a telephone interface.

4. The apparatus of claim 1, wherein the additional user input requested includes at least one of: prompting a user to repeat the first option and prompting the user to clarify the first option.

5. The apparatus of claim 1, wherein the memory stores additional computer readable instructions that, when executed, further cause the apparatus to: store the received first option and the confidence level to establish historical performance of the customer service system and adjust an aspect of the customer service system based on the historical performance.

6. The apparatus of claim 5, wherein the aspect adjusted is a confidence threshold.

7. The apparatus of claim 1, wherein the memory stores additional computer readable instructions that, when executed, further cause the apparatus to:

responsive to the type of the user input being voice command, provide the second option set including options different from options of the second option set provided when the type of the user input is touch tone.

8. A method, comprising:
determining a configurable set of rules for a customer service system having a processor and a customer service interface;
providing a first option set to a customer via the customer service interface;
receiving user input selecting a first option from the first option set via the customer service interface, wherein a type of the user input is one of a voice command and a keypad selection; and
responsive to selection of the first option, providing a second option set to the customer via the customer service interface the second option set being based on the first option selected and the type of the user input,
wherein the type of the user input selecting the first option is voice command, and
wherein the method further comprises:
  determining a confidence level of an accuracy of the received selection of the first option;
  determining whether the confidence level is at or above a predetermined threshold;
  responsive to determining that the confidence level is at or above the predetermined threshold, providing the second option set to the customer; and
  responsive to determining that the confidence level is below the predetermined threshold, requesting additional user input from the customer.

9. The method of claim 8, wherein the second option set is based, at least in part, on a customer characteristic of the customer.

10. The method of claim 8, wherein the additional user input requested includes at least one of: prompting a user to repeat the first option and prompting the user to clarify the first option.

11. The method of claim 8, further comprising: storing the received first option and the confidence level to establish historical performance of the customer service system and adjusting an aspect of the customer service system based on the historical performance.

12. The method of claim 11, wherein the aspect adjusted is a confidence threshold.

13. The method of claim 8, further comprising:
responsive to the type of the user input being voice command, providing the second option set including options different from options of the second option set provided when the type of the user input is touch tone.

14. One or more non-transitory computer readable media storing computer readable instructions that, when executed, cause a customer service system having a processor and a customer service interface to:

determine a configurable set of rules for the customer service system;
provide a first option set to a customer via the customer service interface;
receive user input selecting a first option from the first option set via the customer service interface, wherein a type of the user input is one of a voice command and a keypad selection; and
responsive to selection of the first option, provide a second option set to the customer via the customer service interface the second option set being based on the first option selected and the type of the user input,
wherein the type of the user input selecting the first option is voice command, and
wherein the computer readable media store additional computer readable instructions that, when executed, further cause the customer service system to:
  determine a confidence level of an accuracy of the received selection of the first option;
  determine whether the confidence level is at or above a predetermined threshold;
  responsive to determining that the confidence level is at or above the predetermined threshold, provide the second option set to the customer; and
  responsive to determining that the confidence level is below the predetermined threshold, request additional user input from the customer.

15. The one or more non-transitory computer readable media of claim 14, wherein the second option set is based, at least in part, on a customer characteristic of the customer.

16. The one or more non-transitory computer readable media of claim 14, wherein the additional user input requested includes at least one of: prompting a user to repeat the first option and prompting the user to clarify the first option.

17. The one or more non-transitory computer readable media of claim 14, having additional computer readable instructions stored thereon that, when executed, further cause the customer service system to: store the received first option and the confidence level to establish historical performance of the customer service system and adjust an aspect of the customer service system based on the historical performance.

18. The one or more non-transitory computer readable media of claim 17, wherein the aspect adjusted is a confidence threshold.

19. The one or more non-transitory computer readable media of claim 14, having additional computer readable instructions stored thereon that, when executed, further cause the customer service system to:
responsive to the type of the user input being voice command, provide the second option set including options different from options of the second option set provided when the type of the user input is touch tone.

* * * * *